March 16, 1948. H. A. DUTCHER 2,438,041
PROCESS OF PRODUCING STYRENE FROM BUTADIENE
Filed Aug. 22, 1944
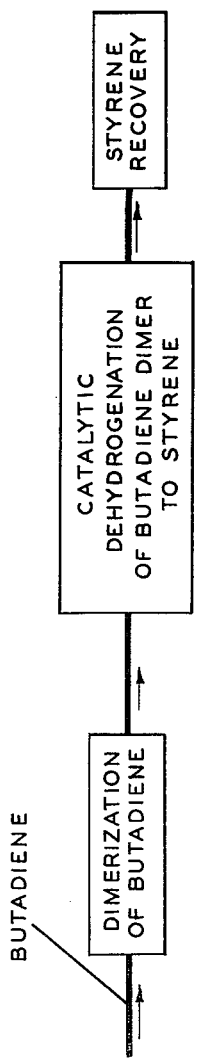
INVENTOR
H. A. DUTCHER
BY Hudson + Young
ATTORNEYS Patented Mar. 16, 1948

2,438,041

UNITED STATES PATENT OFFICE 2,438,041

PROCESS OF PRODUCING STYRENE FROM BUTADIENE

Harris A. Dutcher, Borger, Tex., assignor to Phillips Petroleum Company, a corporation of Delaware Application August 22, 1944, Serial No. 550,553

1 Claim. (Cl. 260—669)

This invention relates to a process of manufacturing styrene. In one specific aspect it relates to a method of making styrene from the cyclic dimer of butadiene, 4-vinylcyclohexene-1. In another specific aspect it relates to a method of making styrene from butadiene.

Styrene is made commercially by the catalytic dehydrogenation of ethylbenzene. It has been unsuccessfully attempted by Sergienko (Bull. Acad. Sci., URSS, ser. chim. No. 3, (1938) pages 753–759) to dehydrogenate butadiene dimer, 4-vinylcyclohexene-1, to styrene. Sergienko obtained ethylbenzene instead of styrene stating that no way could be found of preventing the vinyl side chain in the butadiene dimer from being converted to an ethyl group. Sergienko believed that the process of dehydrogenation of 4-vinylcyclohexene-1 to form ethylbenzene begins with isomerization to form ethylcyclohexadiene. Sergienko found that at 290–310° C. and in the presence of hydrogenation catalysts (Pt. Pd. etc.) the butadiene dimer was converted smoothly to ethylbenzene, while at 135–180° C. in the presence of the same catalysts irreversible catalysis took place in accordance with the following equation:

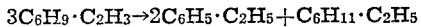

The principal object of the present invention is to provide an improved process of making styrene. Another object is to provide a method of converting butadiene cyclic dimer, 4-vinylcyclohexene-1 directly to styrene. Another object is to convert butadiene to styrene via a 4-vinylcyclohexene-1 route. Another object is to provide an operable and commercially feasible method of dehydrogenating 4-vinylcyclohexene-1 to styrene. Numerous other objects will hereinafter appear.

The accompanying drawing which is self-explanatory illustrates diagrammatically the manner of carrying out the invention in that embodiment wherein butadiene is converted to styrene.

In its broader aspects my invention resides in the discovery that butadiene dimer, 4-vinylcyclohexene-1, can be dehydrogenated in a single step giving good yields of styrene at temperatures of from 400 to 600° C., and preferably 450 to 525° C. This dehydrogenation is almost invariably conducted in the presence of a dehydrogenation catalyst although it may, though far less preferably, be carried out by heat alone in the absence of a catalyst. The reaction is as follows:

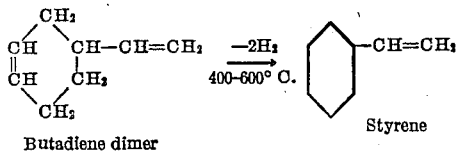

Butadiene dimer          Styrene

Any dehydrogenation catalyst which will catalyze the removal of hydrogen from the ring of the butadiene dimer may be used in the dehydrogenation step. I prefer to use a catalyst which comprises chromic oxide ($Cr_2O_3$), especially a catalyst consisting of chromic oxide deposited on alumina, the chromic oxide ranging from 10 to 30% by weight of the catalyst mass. Such a catalyst is described in Groll et al. U. S. Patent 2,217,865. Instead of this catalyst I may use any other catalyst which will catalyze aromatization of the cyclohexene ring, such as co-precipitated chromium oxide and aluminum oxide; molybdenum trioxide; molybdenum disulfide; nickel sulfide; platinum sulfide; palladium black; vanadium oxide; metallic platinum such as platinum black; metallic nickel; unglowed chromium oxide made by the ignition of ammonium dichromate.

In another embodiment my invention provides a simple and commercially feasible way of making styrene from butadiene. In the practice of this embodiment, 1,3-butadiene is dimerized in manner known per se to produce the dimer, 4-vinylcyclohexene-1 in accordance with the following equation:

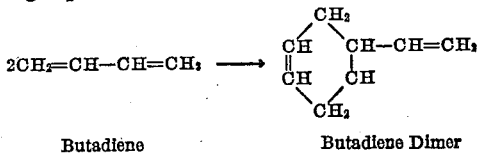

Butadiene          Butadiene Dimer

The dimer is then dehydrogenated to styrene in the manner described above, preferably catalytically.

In continuous operation of such an embodiment of the invention, the butadiene dimer may advantageously be fed directly from the dimerization zone into the dehydrogenation zone as it is formed. Passage of the hot effluent from the dimerization directly into the dehydrogenation zone without separation or recovery of its components but with heating where the dehydrogenation is conducted at a temperature above that of the dimerization is advantageous because heat is conserved and the expense of separating is eliminated.

Presence of some butadiene monomer in the dimer-containing feed stream to the dehydrogenation step has been found to be extremely advantageous. Apparently the free butadiene acts as a hydrogen acceptor, thus facilitating the desired dehydrogenation reaction. The presence of butadiene monomer also minimizes depolymerization of the dimer in the dehydrogenation zone, by the mass action law inasmuch as butadiene is a product of the depolymerization reaction. Furthermore the butadiene monomer functions as a diluent serving to reduce the partial pressure of the reactants without the mechanical disadvantages of operation at subatmospheric pressure. Butane and butenes resulting from the hydrogenation of the butadiene used as hydrogen acceptor may, of course, be recovered from the dehydrogenation effluent and utilized as feed to a dehydrogenation process producing butadiene. Recovery of these materials from the effluent is a comparatively simple and economical procedure.

Instead of using butadiene as hydrogen acceptor in the dehydrogenation of butadiene dimer to styrene, I may, though less preferably, employ other hydrogen acceptors such as olefins such as butylene, lighter olefins, namely propylene or ethylene or heavier olefins than butenes such as pentenes, hexenes, heptenes, etc. Olefin polymers such as diisobutylene or other branched chain octylenes may be employed and thereby converted to isooctane or other branched chain octanes which are suitable for use as aviation and high antiknock fuel blending components.

In order to produce styrene rather than ethylbenzene in the dehydrogenation zone, it is desirable to employ an active dehydrodgenation catalyst and also to employ temperatures in excess of 400° C. The temperature should not be substantially greater than 600° C. if polymerization and breaking of the carbon-to-carbon bond in the side chain are to be avoided. The preferred temperature range is from 450 to 525° C. Contact time should be short enough that a substantial yield of styrene is formed per pass without polymerization or other undesirable side reactions. Any ethylbenzene which may be present in the dehydrogenation effluent is readily separated and recycled to the dehydrogenation unit, thereby increasing the ultimate yield of styrene.

The dehydrogenation may be purely thermal, i. e. non-catalytic, pyrolysis, at higher temperatures but the use of catalysts and lower temperatures is preferred.

The dimerization of butadiene may be accomplished in the following illustrative manner: The butadiene is digested at a temperature in the range of 150 to 480° C. and under a pressure of from 1 to 50 atmospheres, preferably 20 to 30 atmospheres. Solid contact catalysts such as fuller's earth, bauxite, activated alumina, or silica gel may be employed. The butadiene may be in either vapor or liquid phase and the dimer may likewise be in either liquid or vapor phase. It is preferable to so conduct this step of the process as to substantially avoid the formation of higher polymers. Inhibitors may be added if desired to repress the formation of these higher polymers, particularly if the operation is carried out in the lower part of the temperature range specified. No novelty is claimed for this part of my process per se, as it may be carried out in any manner so long as there results a substantial yield of butadiene dimer, preferably together with a minor proportion of unchanged butadiene monomer, and a minimum of heavier polymers. Methods of dimerizing butadiene are disclosed in detail in the application of G. G. Oberfell, Serial No. 352,306, filed August 12, 1940 (U. S. Patent 2,355,392, issued August 8, 1944).

In a preferred embodiment of my invention, the entire effluent from the dimerization process just described is taken directly, without any intermediate cooling or separation steps, except for the separation of any tarry materials or higher polymers than the dimer, into the catalytic dehydrogenation zone. Here the temperature is preferably somewhat higher and the pressure lower than in the dimerization process. Specifically, the temperature may be in the range of from 400 to 600° C. and the pressure atmospheric or slightly greater. Steam, which catalyzes the depolymerization of the dimer of butadiene, is to be avoided in the dehydrogenation step as well as in the dimerization. The effluents from the catalytic dehydrogenation reaction are cooled and separated by conventional means into styrene, ethylbenzene, butane, butenes, and polymers.

It is believed novel to convert butadiene dimer directly to styrene by dehydrogenation in the manner disclosed above. It is also believed novel to produce styrene from 1,3-butadiene by dimerizing the butadiene and catalytically dehydrogenating the dimerization effluent in a single step without cooling or separation into its components to convert the dimer to styrene as the principal product of the dehydrogenation process. It is also believed to be new to dehydrogenate butadiene dimer in the presence of monomeric butadiene as a hydrogen acceptor and depolymerization inhibitor, particularly when styrene rather than ethylbenzene is the principal product of the process.

*Example*

A mixture consisting of 75 per cent by weight of butadiene and 25 per cent of nitrogen was passed in vapor phase through a tube coil maintained at 200° C. and under a pressure of 400 pounds per square inch gauge for a contact time of 3 minutes. Conversion of 43 per cent of the butadiene to dimer took place. The vaporous effluent contained 42.7 per cent of unchanged butadiene, 32.3 per cent butadiene dimer and 25 per cent nitrogen. This effluent was passed directly into a heater which raised its temperature to 520° C. and thence through a catalyst chamber packed with a catalyst consisting of chromic oxide on alumina (15% $Cr_2O_3$ and 85% $Al_2O_3$). The pressure in the catalyst chamber was 20 pounds per square inch gauge and the temperature 515-525° C. The contact time was 1.5 seconds. The effluent contained 13.8 per cent by weight of styrene together with 5.3 per cent of ethylbenzene, unchanged butadiene and some butadiene formed by slight depolymerization of the dimer, butenes and butane formed by hydrogenation of butadiene by the hydrogen liberated from the butadiene dimer, a trace of hydrogen, some ethylene, a trace of benzene, and unchanged butadiene dimer.

Preferably the amount of butadiene monomer present in the dehydrogenation is at least molecularly equal to the butadiene cyclic dimer so that it can accept all of the hydrogen liberated in the conversion of butadiene cyclic dimer to styrene.

I claim:

The process of producing styrene from butadiene which comprises passing butadiene over a solid contact catalyst selected from the group consisting of fuller's earth, bauxite, alumina and silica gel in a dimerization zone at a temperature in the range from 150° to 480° C. and at a pressure in the range from 20 to 30 atmospheres, withdrawing an effluent from said dimerization zone containing not less than one mol of butadiene for each mol of butadiene dimer present, separating tar from said effluent, passing said effluent without further cooling or separation over a solid contact catalyst comprising a mixture of chromium and aluminum oxides, controlling the rate of flow so as to insure a contact time of about 1.5 seconds with said last-mentioned catalyst at a temperature in the range from 400° to 600° C. and a pressure of at least one atmosphere, withdrawing the resulting reaction products and separating styrene therefrom.

HARRIS A. DUTCHER.

REFERENCES CITED

The following references are of record in the file of this patent:

UNITED STATES PATENTS

| Number | Name | Date |
|---|---|---|
| 2,184,235 | Groll et al. | Dec. 19, 1939 |
| 2,217,865 | Groll et al. | Oct. 15, 1940 |
| 2,241,393 | Danner | May 13, 1941 |
| 2,308,229 | Natta | Jan. 12, 1943 |
| 2,376,985 | Voorhees | May 29, 1945 |
| 2,392,960 | Watson | Jan. 15, 1946 |

OTHER REFERENCES

Guljaew et al., Chem. Zentralblatt, 1936, II, page 3727.

Lebedev et al., Chem. Ab., vol. 30, 1023-4 (1936).

Slobodin et al., Chem. Ab., vol. 33, 1281 (1939).

Vanscheidt et al., Industry of Organic Chemistry, vol. 7, pages 593-9 (1940).